Patented Jan. 22, 1952

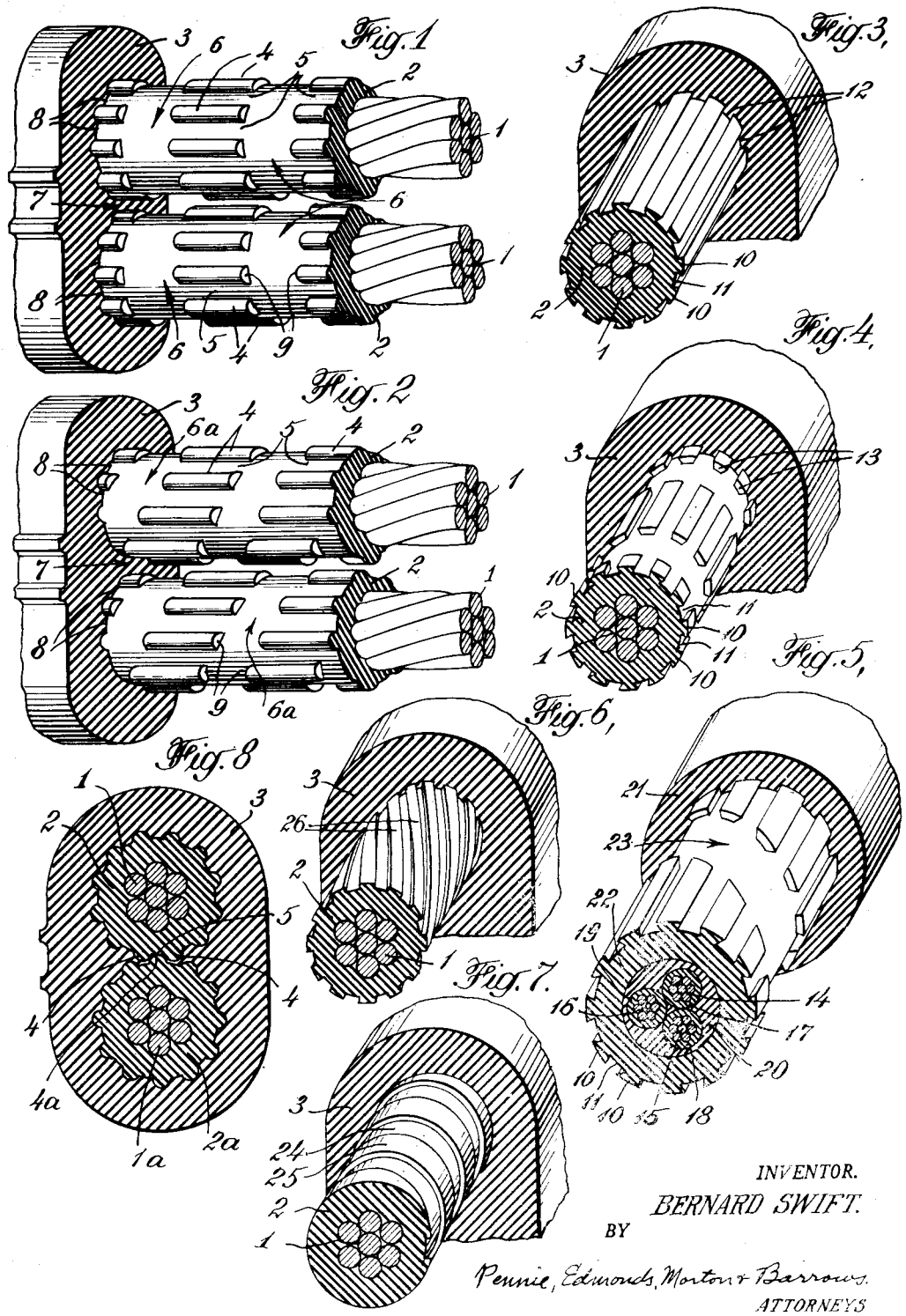
Jan. 22, 1952 — B. SWIFT — 2,583,026
CABLE WITH INTERLOCKED INSULATING LAYERS
Filed Aug. 12, 1949
INVENTOR.
BERNARD SWIFT.
BY
Pennie, Edmonds, Morton & Barrows
ATTORNEYS

2,583,026

UNITED STATES PATENT OFFICE 2,583,026

CABLE WITH INTERLOCKED INSULATING LAYERS

Bernard Swift, Melrose, Mass., assignor to Simplex Wire & Cable Co., Cambridge, Mass., a corporation of Massachusetts Application August 12, 1949, Serial No. 109,899

1 Claim. (Cl. 174—117)

This invention relates to insulated electric cables and especially to those which are likely to be subjected to forces or stresses tending to cause adjacent layers of the cable to move with respect to each other.

Such cables heretofore proposed have usually included cement interposed between adjacent layers for the purpose of reducing the tendency of one layer to move or separate with respect to the other. The use of cement does increase the adhesion between adjacent layers but, at times, it is insufficient to prevent the separation of layers especially in cables subject to considerable mechanical abuse.

In accordance with the construction provided by the present invention any two or more layers of the cable may be mechanically interlocked or caused to adhere more strongly in one or more directions so as to prevent relative movement between, or separation of, such layers. Thus the likelihood of trouble with the cable in service due to slipping or separation of layers, which have caused failures in the past, will be very much decreased and the performance of the cable greatly improved.

The construction according to the invention which provides the advantages above outlined comprises means including such complementary configurations of the interfaces of adjacent layers as to form a plurality of contacting areas lying in different planes. As a result, the layers may be interlocked with each other in any desired directions, for example, circumferentially, longitudinally and radially of the cable. In accordance with the method of the invention these interlocking configurations of the adjacent surfaces may be formed by a die through which the insulating layer is extruded or by which it is molded, or by a separate step or steps after extrusion in the manner hereinafter described.

Referring to the drawings:

Figs. 1–7, inclusive, are isometric views of various modifications of the invention applied to several different forms of cables as follows:

Fig. 1 shows rounded, parallel, annularly interrupted ribs between two adjacent layers of compound or other material in a two-conductor cable;

Fig. 2 shows rounded, parallel ribs, helically interrupted, in a two-conductor cable;

Fig. 3 is a fragmentary view of parallel, dovetail ribs in a multi-conductor cable;

Fig. 4 is a fragmentary view of annularly interrupted, parallel, dovetail ribs in a multi-conductor cable;

Fig. 5 shows helically interrupted, parallel, dovetail ribs between the two outer layers of a three-conductor concentric cable;

Fig. 6 is a fragmentary view of helical, rectangular ribs in a multi-conductor cable; and Fig. 7 is a fragmentary view of helical, rectangular ribs and grooves in a multi-conductor cable.

Fig. 8 is a cross-sectional view of a two-conductor cable having rounded ribs formed on adjacent surfaces of conductor insulation, and disposed so that a rib on the insulating layer surrounding one conductor is within a complementary groove on the insulating layer surrounding the other conductor.

In Fig. 1 there is illustrated a cable including two parallel conductors, and which is of a construction especially suited to heavy duty work such as mining and excavating machinery, and the like. This cable consists essentially of two stranded conductors 1, a layer of conductor insulation 2 around each conductor, and an external layer or sheath 3 of tough, abrasion-resistant and tear resistant material surrounding the whole. The conductor insulation 2 may be formed around the conductor by the usual extrusion process, or otherwise, but in accordance with the invention it is formed so that its external surface is corrugated to comprise alternate ribs 4 separated by grooves 5 integral with the remainder of the layer. In the embodiment of Fig. 1 (and that of Fig. 2) the ribs are curved and are slightly filleted at the base. The material of the ribbed insulation may preferably be non-rigid, various rubber insulating compounds heretofore used for conductor insulation being suitable.

It will be noted that the embodiment illustrated in Fig. 1 comprises ribs which are interrupted by annular spaces or depressions 6. These interruptions may be formed by any of several means, two of which are as follows: If the non-conductive or insulating layer is extruded it will be of material which remains reasonably soft and deformable before it is cured. During this period a suitable interruption-forming tool, such as a roller or knurling tool, may be revolved around the insulation under pressure. As a result, the ribs will be flattened down around the path or track made by the roller or other tool. Alternatively, the tool may be held stationary and the cable rotated on its axis. Any other convenient means for forming the grooves may, of course, be employed.

It will be noted that the insulated conductors are spaced apart sufficiently to permit some of the material of the sheath 3 to come between them to form a fin 7. This construction increases the overall strength of the cable especially against damage due to crushing on the major axis.

The embodiment of Fig. 2 is much the same as that of Fig. 1 and will, therefore, be described only insofar as it differs from that of the former figure. The essential difference is that the interruptions are formed helically rather than annularly. The helical interruptions may be formed in the same manner as are those of Fig. 1, except for the additional step of moving the insulated conductor longitudinally while the interruption-forming tool is in use. Obviously, for short lengths of cable the interruption-forming tool may be moved longitudinally of the cable; but under most conditions it is preferable to move the cable longitudinally of its axis while the interruption-forming tool is rotated around it. As a rule, this is the most convenient method because the entire process can then be continuous. The interrupted sections of the ribs 4 are thus staggered so that the interlocking effect below described is uniform, and the strengthening effect is symmetrical throughout the entire cable.

Consideration of the constructions illustrated in Fig. 1 and Fig. 2 will make evident the several advantages resulting from the features of the invention. First, it will be seen that by the use of comparatively large ribs the contact area between adjacent layers is considerably increased without increasing the dimensions of the cable. By this means the adhesion between layers may be increased either by employing a suitable cement between layers or by using compounds which are self-adhesive. Second, by spacing the ribs apart an appreciable distance by grooves 5, the material of the outer layer 3 is caused to flow into the grooves, forming complementary ribs 8. These complementary ribs thus coact with the ribs 4 on the inner layer to interlock the two adjacent layers so as to prevent circumferential movement or twisting of one layer with respect to the other, which greatly increases the durability of the cable. Third, the interruptions of the ribs form, at closely spaced intervals, end surfaces 9 against which complementary surfaces of the outer jacket 3 are in contact. These contacting surfaces prevent longitudinal movement of one layer with respect to the adjacent layer and thus further increase the strength of the cable, considerably lengthening its useful life. Thus, the above described construction completely prevents the relative movement of adjacent layers in at least two different directions, viz., in this instance, circumferentially and longitudinally of the cable.

The embodiment illustrated in Fig. 3 represents one conductor of a multi-conductor cable, although the construction is equally applicable to single conductor cable. The construction here, however, differs from that of Figs. 1 and 2 chiefly in the form of the ribs and grooves, which are of the dovetail type instead of the curved type of Figs. 1 and 2. Here, the conductor 1 is surrounded by an insulating layer 2 which may be extruded on the conductor through a suitable die forming dovetail ribs 10 and grooves 11 between them. When the compound 3 is applied under pressure around the insulated conductor, this compound will be forced into the grooves 11 to form complementary dovetail ribs 12.

Because of the dovetail shape of the interlocking ribs and grooves of the two adjacent layers 2 and 3, respectively, the cable, as constructed in accordance with Fig. 3, will have the additional advantage of mechanical interlocking in a radial direction. More specifically, the layers of the cable constructed as illustrated in Fig. 3 are mechanically interlocked circumferentially and radially. Furthermore, the construction of Fig. 3 provides considerably more longitudinal adhesion between layers than would be present in the conventional cable having smooth interfaces. Hence in the construction of Fig. 3 there is also less tendency for longitudinal movement between layers than in the usual cable.

The alternative embodiment of Fig. 4 is similar to that of Fig. 3, but differs therefrom in that, as in the case of Fig. 1, the ribs 10 are annularly interrupted to form thereon end surfaces 13 which correspond to end surfaces 9 in Fig. 1. As a result, the adjacent layers 2 and 3 are interlocked circumferentially, longitudinally, and radially of the cable. Hence, a cable constructed as in Fig. 4 is extremely durable because the adjacent layers are mechanically interlocked in all directions.

The embodiment of Fig. 5 is represented as comprising a multi-conductor cable of three, concentric, conductors 14, 15 and 16, which are insulated by insulating layers 17, 18, and 19, respectively. Surrounding the insulated conductors is a filler layer 20, and between the filler layer 20 and the sheath 21 is an intermediate layer or jacket 22. Frequently it is desirable that the intermediate layer, or jacket, 22 be of material having mechanical or electrical characteristics different from those of the covering sheath 21, as well as from those of the filler layer 20. In all cables subject to mechanical abuse, the tendency for the layers to separate is greatest between the sheath and the layer adjacent thereto and this tendency to separate decreases progressively toward the core of the cable. Consequently, the interlocking feature of the invention, as shown in Fig. 5, as introduced between sheath 21 and the intermediate layer 22. Here, as in the embodiments of Figs. 3 and 4, the interlocking is provided by dovetail ribs 10 and intervening dovetail grooves 11. The interlocking dovetail surfaces may be formed by extrusion, or otherwise, as described above in connection with Figs. 3 and 4.

In the cable of Fig. 5, the dovetail ribs are interrupted by a helical depression or interruption 23 which may be formed as described in connection with Fig. 2. Similar interlocking means may be employed between layers 20 and 22 and, if desired, also between filler layer 20 and the insulating layers 17, 18, 19 of the various conductors. In this event all four of the layers would be interlocked as a unit. The same is, of course, true of all of the constructions herein described; because the various interlocking features in accordance with the invention may be applied to advantage between any two adjacent layers, regardless of the number or arrangement of the conductors, and regardless of the number of layers.

The modification illustrated in Fig. 6 comprises a simple embodiment of the invention, but includes many of the advantages already described. Here, the ribs 26 are of rectangular cross-section and are continuous, although, as above indicated, they may be interrupted as shown in others of the figures. The ribs are of twisted or helical form with respect to the longitudinal axis of the cable. Ribs in this form may be made by an extrusion process by relative twisting of the conductor and extruding die while the insulation or other layer is being applied around the conductor.

Obviously, if the ribs are to be applied to the surface of a layer other than the one which insulates the conductor, the same general procedure would be followed as, for example, is described in connection with the modification of Fig. 5. By forming the ribs helically, the layers 2 and 3 are interlocked circumferentially and longitudinally, the longitudinal locking being the result of the helical formation. The flat sides of the longitudinal ribs provide maximum effective areas in contact in a circumferential direction and, therefore, the ribs of this shape need not be so high as those of the form of Figs. 1 and 2, for example, which have curved sides. The areas in contact effectively in a longitudinal direction due to the twisting of the ribs on both of layers 2 and 3 are, of course, the projected surfaces on a plane at right angles to the longitudinal axis of the cable. If desired, any of the ribs herein described may be twisted in the manner illustrated in Fig. 6.

The embodiment of Fig. 7 comprises essentially a smooth cylindrical surface on the conductor insulation 2 into which helical grooves 24 have been cut or otherwise formed as described above in connection with Figs. 2 and 5. It will be apparent that the cable constructed as shown in Fig. 7 comprises adjacent layers which are interlocked circumferentially and longitudinally. The material 25 between turns of the grooves in effect comprises helical ribs which interlock with the complementary grooves formed on the inside adjacent surface of the covering layer 3, and vice versa. Although the ribs and grooves of the embodiments of Figs. 6 and 7 are formed by different methods, the results are quite similar. The pitch or number of turns per unit length of the helix of Fig. 6 will usually be less than that of Fig. 7. If the ribs are made with a 45-degree pitch the resistance to movement longitudinally and circumferentially will be about equal.

The embodiment illustrated in Fig. 8 may, in general, be similar to that shown in Fig. 1, and the ribs may be continuous or interrupted. The cable of this embodiment differs from that of Fig. 1 in that the conductors 1 and 1a are so spaced and the conductor insulation layers 2 and 2a are formed of such thickness that the rib 4a of the insulation of one conductor is disposed within the complementary groove 5 between the ribs 4 of the insulation of the adjacent conductor. When this construction is used, the insulating material surrounding the conductors will be preferably as tough as possible. It will be obvious that this construction has the advantage of additional interlocking of the parts, to prevent relative motion.

In the appended claim the phrase "around (or 'surrounding') the conductor" is intended to include layers adjacent or not adjacent the conductor. Likewise, the reference in the claim to "a conductor" is not intended as a limitation of the number of conductors in any particular cable to which this invention is applied, because the invention has no relation to the number of conductors employed.

I claim:

In an insulated cable especially suitable for heavy duty usage wherein adjacent layers are subjected to large forces tending to cause relative movement therebetween, a conductor, a thick inner layer surrounding the conductor formed of a non-conducting insulating material, a plurality of discrete peripherally and longitudinally spaced ribs formed integrally with said inner layer and projecting outwardly therefrom to a thickness substantially less than said thick inner layer, said discrete ribs having first flat end surfaces, a thick outer layer adjacent to and surrounding said inner layer formed of a tough, abrasion and tear resistant material, and an interlocking rib element integral with said outer layer and extending inwardly from the inner surface thereof to a thickness substantially less than said thick outer layer, said interlocking rib element being of a complementary configuration to said ribs of said inner layer to produce a complete surface to surface contact of said outer layer and interlocking rib element with said inner layer and ribs to prevent circumferential movement therebetween, said interlocking rib element having second flat end surfaces which coact with said first flat end surfaces to prevent longitudinal movement between said inner and outer layers, said discrete ribs being sufficiently non-rigid to maintain intimate contact with said interlocking rib element upon bending of the cable, said discrete ribs being of dove-tail shape and said interlocking rib element being of complementary dove-tail configuration to prevent radial movement between said inner and outer layers.

BERNARD SWIFT.

REFERENCES CITED

The following references are of record in the file of this patent:

UNITED STATES PATENTS

| Number | Name | Date |
|---|---|---|
| 1,285,012 | Brodhun | Nov. 19, 1918 |
| 1,482,908 | Bunker et al. | Feb. 5, 1924 |
| 1,707,700 | Wodtke | Apr. 2, 1929 |
| 1,743,506 | Watson et al. | Jan. 14, 1930 |
| 1,802,302 | Zagorski | Apr. 21, 1931 |
| 1,956,951 | Hinsky | May 1, 1934 |
| 1,957,487 | Buckely et al. | May 8, 1934 |
| 2,019,868 | Owens | Nov. 5, 1935 |
| 2,050,990 | Atkinson | Aug. 11, 1936 |
| 2,198,008 | Iknayan | Apr. 23, 1940 |
| 2,262,493 | Guinzburg | Nov. 11, 1941 |
| 2,455,773 | Johnson | Dec. 7, 1948 |

FOREIGN PATENTS

| Number | Country | Date |
|---|---|---|
| 40,453 | Netherlands | Apr. 15, 1937 |
| 381,038 | Great Britain | Sept. 29, 1932 |
| 479,033 | Great Britain | Jan. 28, 1938 |
| 584,165 | Great Britain | Jan. 8, 1947 |